United States Patent [19]

Wurst

[11] Patent Number: 4,686,402
[45] Date of Patent: Aug. 11, 1987

[54] DRIVE DEVICE FOR INDUCING SWINGING, ROTATION AND LINEAR MOVEMENTS

[75] Inventor: Karl-Heinz Wurst, Korntal-Münchingen, Fed. Rep. of Germany

[73] Assignee: Arnold Müller GmbH & Co KG, Kirchheim/Teck, Fed. Rep. of Germany

[21] Appl. No.: 865,548

[22] Filed: May 20, 1986

[30] Foreign Application Priority Data

May 21, 1985 [DE] Fed. Rep. of Germany ....... 3518104

[51] Int. Cl.⁴ .................... F16H 25/20; B25J 17/02
[52] U.S. Cl. ................................. 310/83; 74/89.15; 74/417; 74/661; 74/665 C; 901/18; 901/23; 901/26
[58] Field of Search ............... 74/89.15, 417, 661, 74/665 C; 310/80, 83, 112, 75 R; 414/744 R; 623/24, 60, 62; 901/18, 23, 24, 26

[56] References Cited

U.S. PATENT DOCUMENTS

| 3,817,403 | 6/1974 | Glachet et al. ................ 901/23 |
| 4,425,818 | 1/1984 | Asada et al. ................ 310/112 |
| 4,431,366 | 2/1984 | Inaba et al. ................ 901/23 |

FOREIGN PATENT DOCUMENTS

| 3303555 | 8/1984 | Fed. Rep. of Germany . |
| 3236526 | 8/1984 | Fed. Rep. of Germany . |
| 3441332 | 5/1985 | Fed. Rep. of Germany . |

OTHER PUBLICATIONS

Luh, J. Y. S., "An Anatomy of Industrial Robots and Their Controls", IEEE Trans. on Automatic Control, v. AC-28, No. 2, Feb. 83, pp. 133-153.

Primary Examiner—Patrick R. Salce
Assistant Examiner—D. L. Rebsch
Attorney, Agent, or Firm—Michael J. Striker

[57] ABSTRACT

A drive for inducing pivoting rotational and linear movements includes a drive unit comprising two coaxial motors and having a pivot axis and a rotation axis normal to the pivot axis, and a drive element formed as a linear drive. The drive unit operated to induce swinging movements about the pivot axis and rotational movements about the rotation axis is interchangeably and releasably connectable to the linear drive. A transmission device interconnects the drive unit with the linear drive.

10 Claims, 1 Drawing Figure

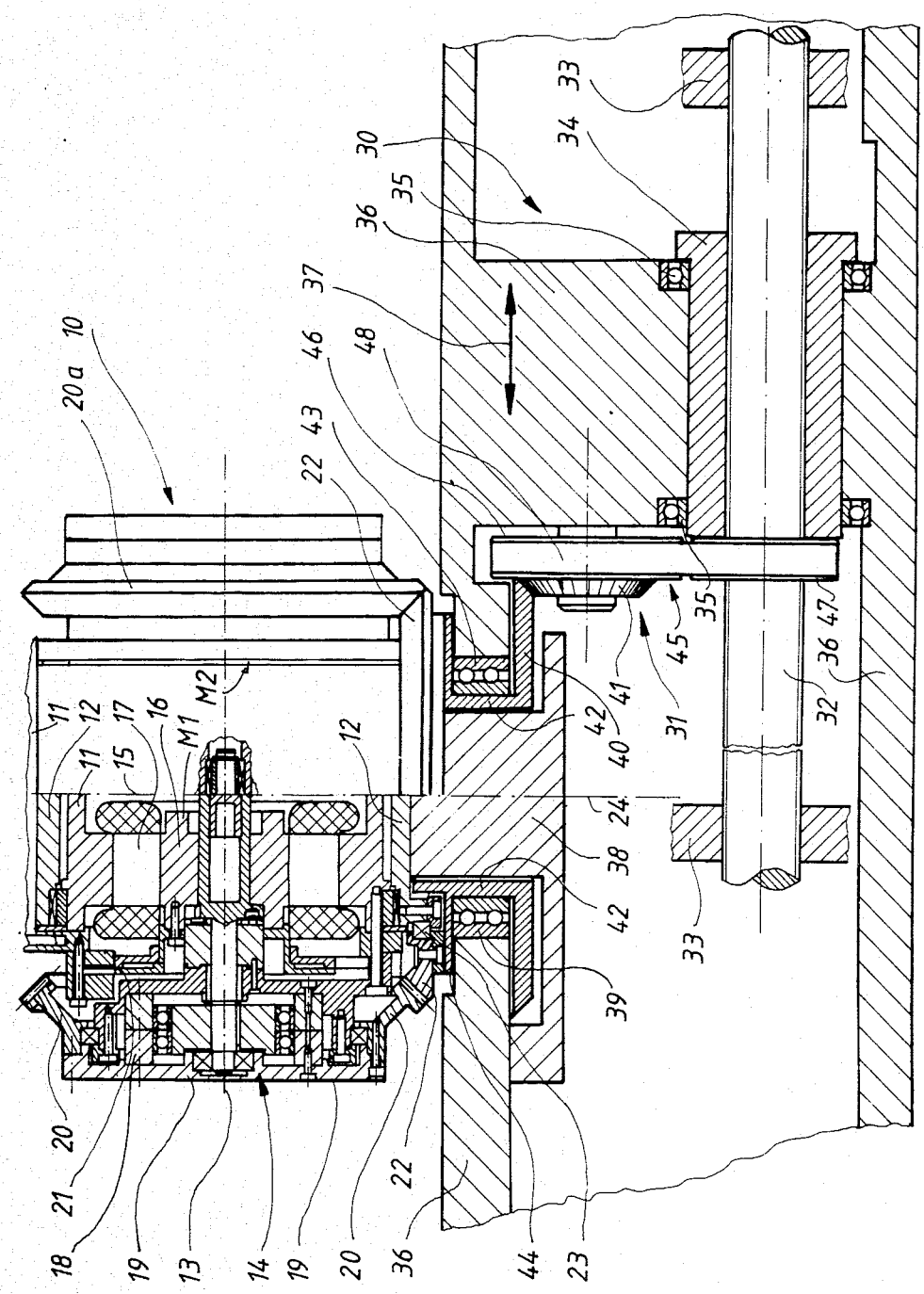

DRIVE DEVICE FOR INDUCING SWINGING, ROTATION AND LINEAR MOVEMENTS

BACKGROUND OF THE INVENTION

The present invention relates to a drive device for inducing oscillation movements and further movements, of the type provided with an articulated drive.

A drive device of the type under discussion has been disclosed in DE-OS No. 33 03555. In this conventional device, a single motor with two driven transmissions mounted at both sides thereof is inserted in the interior of the articulated drive. Such a drive device is suitable for use in industrial robots and also in hand-operated apparatus. A number of such drives combined with each other are utilized in industrial robots. Such combined drive elements, for example can be linear drives having a threaded spindle and a spindle nut driven by a motor (DE-OS No. 32 36 526). The linear drives of this type include a drive motor which, for a flexible use in modular systems, makes the whole device very expensive. For various applications, such a linear drive requires a great deal of space. Such linear drive can be combined with an articulated drive. Such a combination has been, however, expensive and also required a great deal of space. Should the drive provided with these structural components be adjusted upon further designing, this results in completely new drive devices because the individual components are not removable and interchangeable.

SUMMARY OF THE INVENTION

It is an object of the present invention to provide a drive for inducing pivoting, linear and rotation movements which would be a simple and relatively small unit with high power intensity, and which would meet the requirements of a module principle.

This and other objects of the invention are attained by a drive device for inducing swinging, rotation and linear movements, comprising an articulated drive formed as a drive unit which includes two coaxially positioned motors, each provided with a transmission and a path-and-speed measuring system, said drive unit having a pivot axis and a rotation axis extending transversely to said pivot axis, said drive unit producing a swinging movement about said pivot axis and a rotation movement about said rotation axis, said movements being superposed, and a drive element to which said drive unit is releasably connected so that said drive unit is interchangeable, said drive unit being connected to said drive element such that said rotation movement about said rotation axis is induced to said drive element as a drive rotation movement.

A drive device has been proposed, having a drive unit with two coaxial motors and wherein each motor has been provided with a transmission combined with a path-and-speed measuring system, and which has been designed to induce oscillation movements about an axis, a rotation movement about an axis transversal to the aforementioned axis, and wherein both movement are superimposed (No. P 34 41 332.4). The articulated drive is of a simple and small design with a small number of structural components. Mass ratios are favorable. However, movements about two axes can be combined in this conventional drive but these movements can not be induced alternatively or simultaneously. A separate articulated drive is required for each movement about one axis, that is, one drive for the oscillation or pivoting and the other drive for the rotational movement of the first drive.

Due to the provision of two motors with the assigned transmissions each motor can, simultaneously with the other motor, be used for the swinging movement and for the rotation movement. Since both motors are provided with separate transmissions, they can be differently controlled, for example to be set in the same direction of rotation or in opposite directions, with the same angular speeds or with different angular speeds. Accordingly, controlled movements about the pivot axis and about the rotation axis extending normally to the pivot axis are possible.

The drive device according to the present invention makes it possible to have a single drive unit which can be used to provide various movements, namely when both drive motors are controlled to run in opposite directions a relative rotation is generated; the drive unit can also drive a drive element coupled thereto via the drive rotation movement of the articulated drive. This drive element can be of any kind. It can be, for example, the drive element to which a rotary drive movement can be induced as a drive movement, in which it will be transformed into a pivoting or rotation movement.

The drive element itself in the device of this invention requires no drive. Thus the drive element is more compact, lighter and is less expensive than those known in the art.

The drive system of the invention meets all the standards and requirements of block-type or module systems in which only few elements can be releasably engaged with each other for various applications.

Thus when the articulated drive formed as an interchangeable drive unit releasably-connectable to the drive element is attached to the drive element it serves as a quasi drive motor for the linear drive, whereby a noramlly required drive motor for the linear drive can be omitted. Therefore the device according to the invention can be applied to many fields, for example to the robot industry, as well as to machine tools and the like.

The drive device of this invention is generally applicable when, for example a linear adjustment movement and a swinging movement are required, including a linear horizontal and vertical adjustment as well as an oblique adjustment movement. A user can be extremely flexible with the device, of this invention. The device can be easily disassembled and assembled so as to fulfill various functions.

A further advantage of the drive device of this invention is that the drive element, particularly a linear drive, requires no additional spaced for a motor.

The drive element may include transmission means and said drive unit includes a driving member coupled to said transmission means, said driving member forming a drive for said driving element.

The drive element may include a threaded spindle and a spindle nut mounted on said spindle.

The linear drive may further include a carrier which supports said spindle rotation-fixed, and a carriage in which said spindle nut is freely rotationally supported, said carriage being displaceable, said drive unit being releasably connectable to said carriage, said driving member being at least directly and via said transmission means coupled to said spindle nut.

The axis of rotation of the drive unit and a central axis of said spindle may extended at right angles to each other.

The transmission means may include a bevel gear pair operatively interconnected between said driving member and said spindle nut.

The drive unit may include a hollow shaft and a connecting member supported in said hollow shaft, said hollow shaft carrying one bevel gear of said bevel gear pair, said hollow shaft with said one bevel gear being engaged with said driving member for joint rotation herewith.

The transmission means may further include translation means for operatively connecting a second bevel gear of said bevel gear pair to said spindle nut.

The translation means may be a belt drive including a first disc on said spindle nut, a second disc driven from said second bevel gear and a drive belt coupling said first and second disc to each other. The belt drive may be a tooth belt drive.

The novel features which are considered as characteristic for the invention are set forth in particular in the appended claims. The invention itself, however, both as to its construction and its method of operation, together with additiona objects and advantages thereof, will be best understood from the following description of specific embodiments when read in connection with the accompanying drawing.

BRIEF DESCRIPTION OF THE DRAWING

The single figure of the drawing illustrates a schematic, partially sectional, side view of the drive device for generating oscillation movement with alternative or superimposing linear movement.

DETAILED DESCRIPTION OF THE PREFERRED EMBODIMENTS

The drive device according to the invention comprises an articulated drive 10 which includes two hinge halves 11 and 12 which are swingable relative to each other about a pivot axle 13. The articulated drive 10 has a drive unit 14 arranged therein. The drive unit 14 is formed similarly at both sides of its plane of symmetry 24, therefore only the elements at the left-hand side of the drive unit are shown in section and will be described in detail.

The drive unit 14 includes an electric drive motor having a rotor 16 and a stator 17. Stator 17 is a portion of the hinge half 11, while rotor 16 is a part of the second hinge half 12.

A transmission 18, formed for example as a planetary gear or a harmonic drive transmission, is situated between two hinge halves 11 and 12 at the left-hand side of the pivot axle 13 in the known fashion. One portion of the transmission 18 is driven by the rotor 16 of a motor MI while the driven portion of the transmission 18 is coupled with the hinge half 11. The transmission 18 is connected at the end of axle 13 with a cover plate 19 at which a bevel gear 20 is supported. A travel path-and-speed measuring system is further positioned between the rotor 16 and stator 17. A disc 21 of this system driven by rotor 16 can be seen. At the right-hand side from the axis of symmetry 15, is provided the drive unit similar to the drive unit 14; a bevel gear 20a of which is indicated in the drawing.

Both bevel gears 20 and 20a, which are driven upon the switching on of the motors M1 and M2, are in mesh with a common bevel gear 22 which is rotatable by means of a bearing 23 about an axis of rotation 24 relative to the hinge half 12. The axis of rotation 24 extends transversely of the pivot axle 13 and at least substantially at right angles thereto.

If motors M1 and M2 are controlled and an angular speed or an angle value of the rotation movement of both motors is the same, and also similarly directed, a pure oscillation movement of the articulated drive 10 about the pivot axle 13 results. Both bevel gears 20, 20a are supported on and are engaged with the common bevel gear 22 which leads to a so-called pure oscillation or swinging movement of link halves 11, 12 relative to each other about the axle 13 without the rotation of the bevel gear 22.

If the motors M1 and M2 are controlled so that they rotate with the same angular speed but in opposite directions, a relative rotation movement of the common articulated drive 10 about the rotation axis 24 relative to the bevel gear 22 takes place. If both motors M1 and M2 are controlled so that they rotate in the same direction but with different angular speeds a swinging movement about pivot axle 13 and a simultaneous rotation about the axis 24 result.

During the pure oscillation movement about the axis of swinging 13 complete torques of both motors M1 and M2 are available as also during the pure rotation about axis 24. During the combined movement not only with the oscillation but also with the rotation a power separation takes place.

The specific feature of the drive device according to the invention resides in that the articulated drive 10 is interchangeably and releasably connectable as a complete block to a further drive element 30 and that the drive rotation movement which is imparted during the rotation about axis 24 to the bevel gear 22 is introduced as a drive rotation movement to the drive element 30. In the exemplified embodiment, the drive element 30 is driven-coupled by means of a transmission member 31 with a drive member in the form of the bevel gear 22 for carrying out the drive rotation movement of the articulated drive 10, whereby the drive member in the form of the bevel gear 22 forms the drive for the drive element 30.

The drive element 30 is formed here as a linear drive which has a threaded spindle 32 in the form of a ball-type rotary spindle which is supported on a linear drive carrier 33 rotation-fixed. A further structural component of this linear drive is a spindle nut 34 which is axially movable and freely rotatable on the threaded spindle 32. The spindle nut 34 is freely-rotatably supported by means of bearing 35 in a linear drive carriage 36 which is in a conventional manner translatory-displaceable by means of non-shown guides relative to the linear drive carrier 33 in the directions of arrow 37. The articulate drive 10 with its hinge half 12 is rigidly situated on the linear drive carriage 36. The fastening is carried out, for example by a fastening member 38 mounted to the hinge half 12. Fastening member 38 extends through an opening 39 of the linear drive carriage 36 and is engaged with the latter so that the articulated drive 10 with the hinge or link half 12 is rigidly connected to the linear drive carriage 36 and is carried thereby. The fastening member 38 can be a quick-clamping element which provides a relatively fast dismantling of the drive 10 from the carriage 36.

The drive member in the form of the bevel gear 22 performing the drive rotation movement is, in the exemplified embodiment, coupled by means of the transmission member 31 with the spindle nut 34. It is evident that the transmission member 31 can be omitted and the drive can take place directly.

The transmission member 31 in this embodiment includes a bevel gear transmission with a bevel gear 40 which is in mesh with a second bevel gear 41. The bevel gear 40 is supported on the end of a hollow shaft 42 for a joint rotation with the articulated drive 10. The hollow shaft 42 is axially and radially supported in the opening 39 by means of bearings 43. The hollow shaft 42 is further provided with a flange 44 facing the articulated drive 10. Flange 44 is in a torque-translating connection with the bevel gear 22 inducing the drive rotation movement.

The second bevel gear 41 is rotationally supported in the carriage 36. A transmission translator or transmitter 45 transmits torque from carriage 36 to the spindle nut 34. The transmitter 45 includes, in the preferred embodiment of the invention, a belt drive which has one disc 46 driven from the second bevel gear 41, and a second disc 47 connected to the spindle nut 34 for joint rotation therewith, and two coupling drive belts 48. The belt drive is formed as a gear belt drive, and both discs 46, 47 as well as drive belts 48 have respective engageable teeth.

It is of course understandable that any other suitable torque translator can be utilized in the device of this invention. For example a gear transmission can be used whereby the second bevel gear would be similarly rotation-fixed to the spindle nut 34.

In this embodiment of the drive device, the link halves 11 and 12 of the drive 10 are pivotable about the pivot axle 13 relative to each other only when the motors M1 and M2 are controlled so that they rotate in the same direction and with the same angular speeds. Then the link half 11 pivots about pivot axle 13 relative to the other link half 12 and the linear drive carriage 36.

If, however, the motors M1 and M2 are controlled so that their angular speeds are directed opposite each other, the rotary drive movement of the bevel gear 22 about rotation axis 24 is performed. Thereby the first bevel gear 40 and the second bevel gear 41 are driving elements while the spindle nut 34 is rotationally driven by the belt drive 45; the spindle nut rotates on the stationary threaded spindle 32 and thereby a translatory movement in the direction of arrows 37 will be imparted to the carriage 36. The drive element 30 is in this manner linearly driven in the direction of arrows 37 by the drive 10.

If the motors M1 and M2 are controlled so that they rotate in the same direction but with different speeds the oscillation movement about axle 13 with simultaneous translatory drive movement in the direction of arrows 37 takes place.

A common motor output of two motors M1 and M2 can be applied for two main movements—the oscillation or tilting about axle 13 and the linear movement in the direction or arrows 37. Density of energy is higher when two separated drives are utilized. It is particularly advantageous that the drive device meets high requirements to a unit system because only the basic elements for various embodiments are provided and can be used. The drive device of the invention can be also used in industrial robots. The application of the device is also possible in the fields of machine tools, assembly robots or the like. Also possible is the utilization of the device where special horizontally inserted structural components must be used. The assembled unit with such elements as the articulate drive 10 and the drive element 30 for linear driving can be used in many new apparatus. The device of the invention substantially reduces manufacturing costs for providing the aforementioned movement and offers a variety of combinations.

It is further advantageous that, at the same time, the drive for actuation the spindle nut 34 can be omitted whereby the linear drive element 30 is small, inexpensive, compact and light. Moreover various applications are possible, which would encounter no space problems. The drive element 30 practically requires little space and can be installed into the device without disturbing the drive motor. The carriage 36 can be provided at any convenient place.

It is understandable that the linear drive element 30 can be used for machine tools, hand-operated tools, industrial robots and the like whereby the drive element can extended in the space provided therefor horizontally, vertically or obliquely. If the drive element is provided in the region of ground axis or hand axes of the industrial robot the movement direction would be vertical.

It will be understood that each of the elements described above, or two or more together, may also find a useful application in other types of drive devices differing from the types described above.

While the invention has been illustrated and described as embodied in a drive device for producing oscillating and linear movements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive device for inducing swinging, rotation and linear movements, comprising an articulated drive (10) formed as a drive unit which includes two coaxially positioned motors (M1, M2) each provided with a transmission and a path-and-speed measuring system, said drive unit having a pivot axis (13) and a rotation axis (24) extending transversely to said pivot axis, said drive unit generating a swinging movement about said pivot axis and a rotation movement about said rotation axis and said movements being superposed, and a drive element (30) to which said drive unit is releasably connected so that said drive unit is interchangeable, said drive unit being connected to said drive element such that said rotation movement about said rotation axis is induced to said drive element as a drive rotation movement, said drive element including transmission means (31, 45) and said drive unit including a driving member (22) coupled to said transmission means, said driving member forming a drive for said drive element (30), said drive element being a linear drive in which at least one element is at least directly and via said transmission means loadable by said drive unit, said axis of rotation and a central axis of said linear drive extending at right angles to each other.

2. The drive device as defined in claim 1, wherein said drive element includes a threaded spindle (32) and a spindle nut (34) mounted on said spindle.

3. The drive device as defined in claim 2, wherein said linear drive further includes a carrier (33) which supports said spindle rotation-fixed, and a carriage (36) on which said spindle nut is freely rotatinally supported, said carriage being displaceable, said drive unit (10) being releasably connectable to said carriage, said driving member (22) being at least directly and via said transmission means coupled to said spindle nut.

4. The drive device as defined in claim 2, wherein said transmission means includes a bevel gear pair (40, 41) operatively interconnected between said driving member (22) and said linear drive.

5. The drive device as defined in claim 4, wherein said drive unit (10) includes a hollow shaft (42) and a connecting member (38) supported in said hollow shaft, said hollow shaft carrying one bevel gear (40) of said bevel gear pair, said hollow shaft with said one bevel gear being engaged with said driving member (22) for joint rotation therewith.

6. The drive device as defined in claim 5, wherein said transimssion means includes means for operatively connecting a second bevel gear (41) of said bevel gear pair to said spindle nut.

7. The drive device as defined in claim 6, wherein said connecting means is a translation means (45) interconnected between said second bevel gear (41) and said spindle nut.

8. The drive device as defined in claims 7, wherein said translation means (45) is a belt drive including a first disc (47) on said spindle nut (34), a second disc (46) driven from said second bevel gear (41) and a drive belt coupling said first and second disc to each other.

9. The drive device as defined in claim 8, wherein said belt drive is a gear belt drive.

10. A drive device for inducing swinging, rotation and linear movements, comprising an aritculated drive (10) formed as a drive unit which includes two coaxially positioned motors (M1, M2) each provided with a transmission and a path-and-speed measuring system, said drive unit having a pivot axis (13) and a rotation axis (24) extending transversely to said pivot axis, said drive unit generating a swinging movement about said pivot axis and a rotation movement about said rotation axis and said movements being superposed, and a drive element (30) to which said drive unit is releasably connected so that said drive unit is interchangeable, said drive unit being connected to said drive element such that said rotation movement about said rotation axis is induced to said drive element as a drive rotation movement, said drive element including transmission means (31, 45) and said drive unit including a driving member (22) coupled to said transmission means, said driving member forming a drive for said driving element (30), said drive element (30) being a liner drive in which at least one element is at least directly and via said transmission means loadable by said drive unit, said axis of rotation and a central axis of said linear drive extending at right angles to each other, said transmission means including a bevel gear pair (40, 41) operatively interconnected between said driving member (22) and said linear drive.

* * * * *